Nov. 5, 1929.  G. MacKAY  1,734,094
DIRECTION SIGNAL
Filed Jan. 30, 1928  2 Sheets-Sheet 1
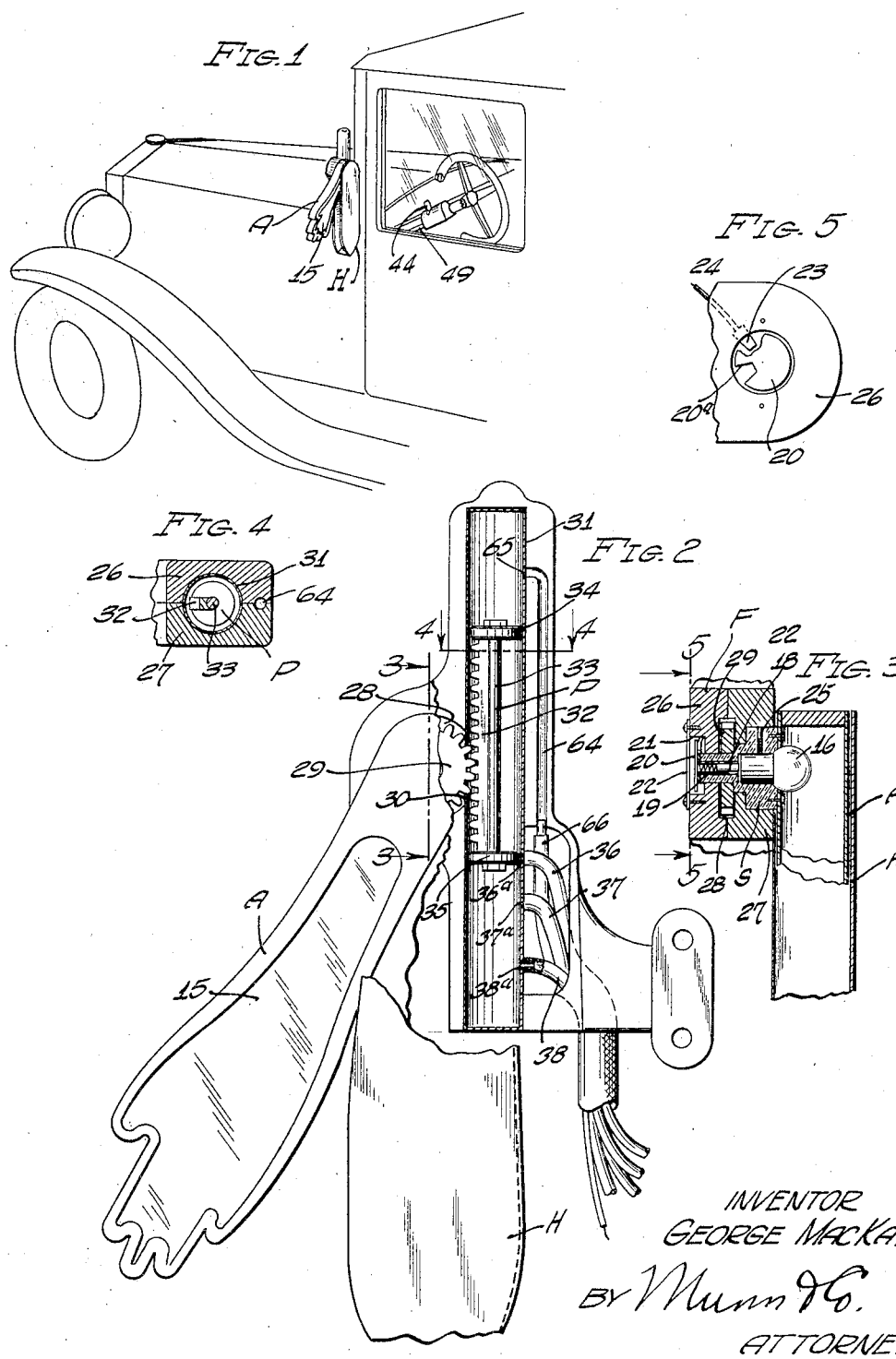
INVENTOR
GEORGE MacKAY
BY Munn & Co.
ATTORNEY

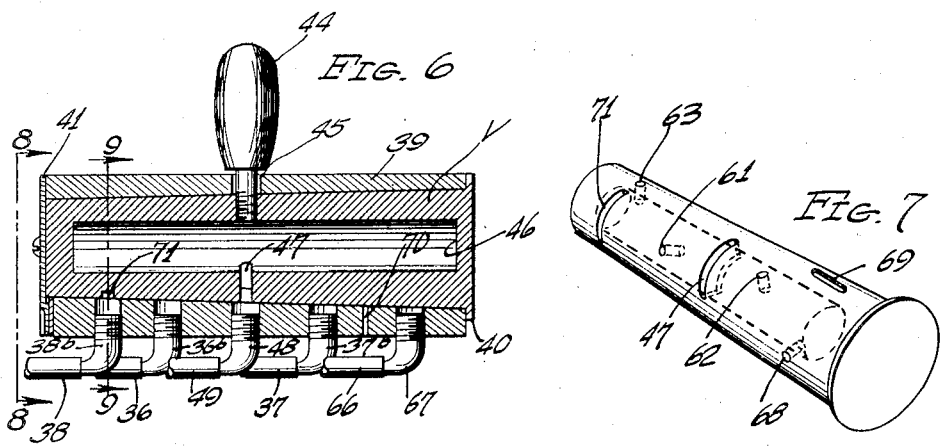
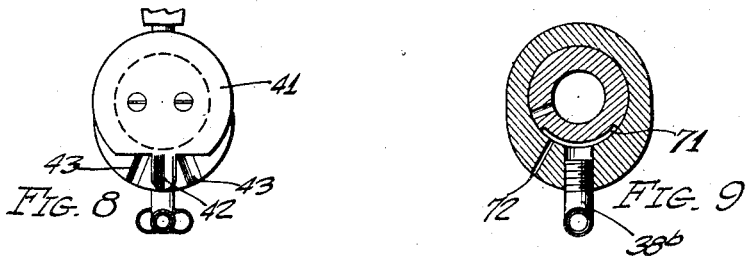
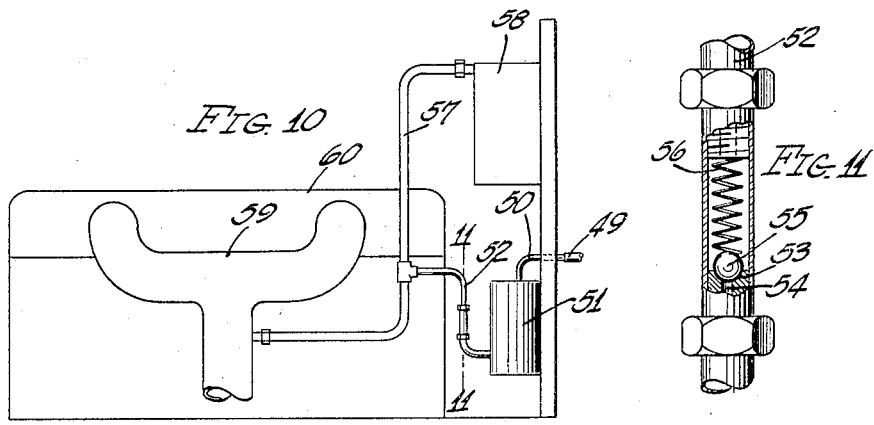

Patented Nov. 5, 1929

1,734,094

UNITED STATES PATENT OFFICE

GEORGE MacKAY, OF LOS ANGELES, CALIFORNIA

DIRECTION SIGNAL

Application filed January 30, 1928. Serial No. 250,551.

My invention relates to direction signals for automobiles, and it has for a purpose the utilization of the vacuum produced at the intake manifold of the vehicle's engine for actuating the semaphore arm of the signal to secure the several indications and by which the movements of the automobile, as contemplated by the operator, may be conveyed to pedestrian and vehicular traffic.

It is also a purpose of my invention to provide a direction signal embodying a principle of storage of vacuum which insures proper operation of the signal irrespective of the amount of vacuum being produced by the engine, such principle being adaptable to vacuum-operated windshield wipers or any other device depending upon vacuum for operation.

I will describe only one form of direction signal of automobiles embodying my invention and will then point out the novel features in claims.

Fig. 1 is a fragmentary view showing in phantom perspective an automobile having applied thereto one form of direction signal embodying my invention;

Fig. 2 is an enlarged view showing in side elevation and partly in section the semaphore arm, support, and operating mechanism therefor and of a signal shown in Fig. 1;

Figs. 3 and 4 are sectional views taken on the lines 3—3 and 4—4, respectively, of Fig. 2;

Fig. 5 is a view taken on the line 5—5 of Fig. 3;

Fig. 6 is an enlarged longitudinal sectional view of the control valve in the signal shown in Fig. 1;

Fig. 7 is a detail perspective view of the valve shown in Fig. 6;

Fig. 8 is a view taken on the line 8—8 of Fig. 6;

Fig. 9 is a sectional view taken on the line 9—9 of Fig. 6;

Fig. 10 is a phantom view of the automobile engine and showing a vacuum storage tank associated therewith and embodying my invention; and Fig. 11 is an enlarged sectional view taken on the line 11—11 of Fig. 10.

Similar reference characters refer to similar parts in each of the several views.

Referring specifically to the drawings, and particularly Figs. 1 and 2, my invention in its present embodiment comprises a semaphore arm A shaped to simulate the outline of the human hand, and preferably hollow, with glass panels 15 to permit illumination thereof at night by means of an electric lamp 16. This semaphore arm is movable about a horizontal axis to occupy the usual signalling positions, namely: Right, Left, and Stop, and a non-signalling position in which it is concealed within a housing H. As shown in Fig. 3 the housing H is secured to a frame F provided with an extension 17 constituting a bracket adapted to be secured to the car body, preferably adjacent or on the left front body post, as illustrated in Fig. 1, so as to be within view of the operator of the vehicle.

As best shown in Fig. 3, the semaphore arm A is fixed at its upper end to a stub shaft S formed of insulating material and provided with a socket in which the plug of the lamp 16 is adapted to seat. The lamp 16 is of the single contact type and is hence provided with a contact 18 extending into a conducting sleeve 19 to which latter is fixed a contact plate 20 disposed within a pocket 21 of the frame F with the latter closed by a cover plate 22. In Fig. 5 the cover plate 22 is removed to reveal the construction of the contact plate 20. As shown, the contact plate is provided with a notch 20ª of such area to freely receive therein a stationary contact 23 connected to a wire 24. This contact 23 constitutes one terminal of a circuit (not shown) including a source of current such as a battery (not shown), while a spring-pressed contact 25 provides the other terminal of the circuit and, as shown in Fig. 3, is in electrical contact with the plug of the lamp 16 and the frame F. The frame is formed of conducting material and is grounded to complete a circuit through the grounded side of the source of current as will be understood. The purpose of the notch 20ª in accommodating the stationary contact 23 is to disrupt the lamp circuit when the arm A is in non-signalling position, and will thus be understood that the lamp 16 is illuminated only when the semaphore arm is in one of its signalling positions.

The frame F is made up of two sections 26 and 27 suitably secured to each other and having their confronting sides constructed to form a pocket 28 (Figs. 3 and 4) in which rotates a gear 29. This gear projects through a slot 30 in a cylinder 31 and constantly meshes with a rack bar 32 secured to a piston P. This piston is movable in the cylinder 31 and comprises a rod 33 to which the rack bar is suitably fixed and at the ends of which are heads 34 and 35. The cylinder 31 is accommodated by the sections 26 and 27 of the frame and is completely housed thereby as will be clear from an inspection of Fig. 4.

The piston P is adapted to be pneumatically reciprocated in the cylinder 31 to impart a corresponding movement to the rack bar 32 and thereby actuate the gear 29 to move the arm A to any one of its several signalling positions and to return the arm to non-signalling position. Although I am employing air to actuate the piston I am dealing with negative pressures in order that I may utilize the vacuum produced at the intake side of the automobile engine. To conduct or transmit the negative pressure or vacuum of the motor to the cylinder 31 to produce downward movement of the piston P and to the various required degrees for causing the semaphore arm to assume its various signalling positions, I provide tubes 36, 37, and 38 connected, respectively, at one end to ports 36ᵃ, 37ᵃ, and 38ᵃ in the cylinder 31 below the normal uppermost positions of the piston P. As shown in Fig. 2, these ports 36ᵃ, 37ᵃ, and 38ᵃ are arranged one above the other in order to progressively reduce the pressure of air at the lower side of the piston and thereby definitely control its downward movement. In proceeding downwardly the piston head 35 functions to progressively close the ports so that after the piston has reached any one of its three positions further reduction in air pressure will cease and the piston, as a consequence, will be maintained in this predetermined position so as to hold the semaphore arm in a corresponding position. The opposite ends of the tubes are connected, respectively, to pipe elbows 36ᵇ, 37ᵇ, and 38ᵇ which, as shown in Fig. 6, are threaded in suitable openings in a cylindrical body 39. This body 39 is adapted to be secured to any suitable part of the automobile, preferably on the steering post, as illustrated in Fig. 1, so as to be in convenient reach of the operator of the vehicle. As shown in Fig. 6, the body 39 is provided with a tapered bore in which is rotatable a correspondingly shaped valve V. One end of the valve is formed with a lip 40 which abuts one end of the body 39, the opposite end of the valve having secured thereto a plate 41 provided, as shown in Fig. 8, with a lug 42 adapted to engage within either of three recesses 43 and thereby providing a finder and latch for releasably securing the valve in any one of the three positions which it is adapted to occupy. The valve is movable manually through the medium of a handle 44 secured to the valve and projecting through a suitable slot 45 formed in the body 39. The valve is hollow to provide a chamber 46 and slotted to form an elongated port 47 which is in constant communication with a pipe elbow 48 threaded in the body 39. The elbow is connected to one end of a tube 49 which extends from the body 39 downwardly to a pipe 50 projecting through the dash-board of the automobile and extending into the top of a closed tank 51. Adjacent the bottom of the tank 51 a pipe 52 is connected thereto, and in the vertical portion of this pipe is a plug 53 having a port 54 therein with the upper end of the plug concaved to provide a seat for a ball valve 55. By means of a spring 56 the valve is yieldably urged to closed position with respect to the port 54. The opposite end of the pipe 52 is connected to the usual pipe line 57 employed for connecting the gasoline vacuum tank 58 to an intake manifold 59 of the engine 60.

By connecting the tank 51 to the intake manifold, as above described, the suction created in the manifold when the engine is operated produces a partial vacuum in the pipe 52, and when this vacuum is built up to a degree sufficient to overcome the tension of the spring 56 and the weight of the ball 55 the valve opens, thus placing the tank 51 in communication with the intake manifold. By providing the tank 51 an enclosed chamber of relatively large area is formed in which a relatively high degree of vacuum can be formed and thereby providing a supply of vacuum which is adapted to be utilized to compensate for any inadequacy in respect to the vacuum-producing property of the engine. The exact manner in which this storage tank functions will be more fully set forth when describing the operation of the signal.

Through the medium of the pipe 50, tube 49, and the elbow 48, the vacuum produced, as above described, is transmitted to the valve chamber 46 and from the latter to the different tubes 36, 37, and 38 by the provision of ports 61, 62, and 63. The ports 61, 62, and 63 are positioned as illustrated in Fig. 7 in order that they may be brought into registration with the pipes 36ᵇ, 37ᵇ, and 38ᵇ, respectively, and in different positions of the valve V.

To insure proper operation of the piston P in moving the semaphore arm to its signalling positions and returning it to non-signalling position, it is necessary that air at atmospheric pressure be admitted to one side or the other of the piston, depending upon its direction of movement, and to thereby render the vacuum produced in the cylinder fully effective in moving the piston. To this end the frame F is provided with a conduit 64 (Figs. 2 and 4), extending up one side of the cylinder 31 with its upper end communicating with a cylinder port 65, and its lower end connected to a tube 66 which extends to and is connected with an elbow pipe 67 threaded in the valve body 39, as shown in Fig. 6, and with which a valve port 68 and a valve groove 69 are adapted to separately register. The groove 69 extends longitudinally of the valve V and is so positioned that when in registration with the pipe 67 it places a vent port 70 of the valve body in communication with the pipe so that air from atmosphere can pass into the pipe and from the later through the tube 66, conduit 64 and into the cylinder through the port 65 to the upper side of the piston P. By this admission of air at atmospheric pressure it may be said that the vacuum created at the lower side of the piston is permitted to properly act in moving the piston downwardly but in reality the negative pressure produced by the vacuum at the lower side of the piston merely permits the air admitted to the upper side of the piston to force the piston downwardly.

In returning the piston P to its uppermost position, it is likewise necessary to produce a vacuum at the upper side of the piston and a positive pressure at the lower side. By moving the valve V to a position in which the port 68 registers with the pipe 67 the valve chamber 46 is thus placed in communication with the pipe 67 so that the negative pressure produced by the motor is transmitted from the port 47 through the chamber 46 and port 68 to the pipe 67, and thence to the upper side of the piston P through the conduit 64. With the valve V in this position a circumferential groove 71 in the periphery of the valve is brought into registration with the pipe 38$^b$ and a vent port 72, all as clearly shown in Fig. 9. As the pipe 38$^b$ is connected to the tube 38 air from atmosphere can now pass through the port 72, groove 71, pipe 38$^b$, tube 38, and port 38$^a$ into the cylinder at the lower side of the piston P. As this admission of air occurs simultaneously with the withdrawal of air from the upper side of the piston, it will be manifest that the piston P is, as a result, moved upwardly to its normal position.

In practice, the operator of the vehicle can, by a manipulation of the handle 44, move the valve V to any of its several positions to place any port or groove in communication with the respective elbow pipes so as to transmit positive or negative air pressures to either side of the piston P and thereby move the semaphore arm A to or from any of the signalling positions, the lamp 16 being illuminated when the arm is in any one of its signalling positions so as to render it visible at night.

In actual practice, the vacuum produced by the engine 60 does not remain constant by reason of the variation in speed of the engine. As the engine speed varies inversely with the load when the automobile is ascending a hill the engine speed decreases and frequently to such a degree that the suction produced at the intake side of the engine is insufficient to create adequate vacuum for operation of the signal. However, by the provision of the storage tank 51 such a defect is eliminated. With the engine operating at the normal speed, sufficient suction is produced in the pipe 52 to retain the valve 55 in open position thus withdrawing air from the tank 51, and thereby creating in the tank a relatively high degree of negative pressure or vacuum. As long as the negative pressures at the intake manifold and within the tank 51 are the same or the negative pressure at the manifold greater than that in the tank, the valve 55 will remain open. However, as soon as the negative pressure at the manifold drops below the pressure in the tank 51, the valve 55 closes so that the tank is no longer in communication with the manifold. This naturally prevents loss of negative pressure in the tank back through the manifold and, consequently, the vacuum supply is retained. This supply is sufficient to insure operation of the signal for a period sufficient to span any ordinary interval in which the suction produced at the manifold is subnormal as a consequence of the temporary reduction in speed of the engine. It will, of course, be understood that as soon as the normal speed of the engine is restored and with it the corresponding increase in suction produced, the valve 55 will be opened to again place the tank 51 in communication with the manifold 59. This vacuum storage principle is likewise applicable to a windshield wiper of the vacuum-operated type to insure continued oscillation of the wiping element particularly when the automobile is ascending the hill.

Although I have herein shown and described only one form of direction signal embodying my invention, it is to be understood that various changes and modifications may be made herein without departing from the spirit of the invention and the spirit and scope of the appended claim.

I claim:

In a direction signal, a semaphore, a cylinder, a piston operatively connected to the semaphore and movable in the cylinder to cause the semaphore to occupy any one of several signalling positions, vacuum-producing means for actuating the piston having a plurality of connections with the cylinder at different points and at opposite sides of the piston to effect different degrees of movement of the piston in either direction, means admitting air at atmospheric pressure to that side of the piston opposite the side at which the vacuum is produced, and a valve for controlling both of said means and having a casing and a valve body provided with ports so positioned therein and in respect to each other that by manipulation of the valve body the vacuum-producing means is connected to one side or the other of the piston while the means for admitting air to the cylinder is connected to the opposite side of the piston.

Signed at Los Angeles in the county of Los Angeles and State of California this ninth day of January, 1928.

GEORGE MacKAY.